(12) United States Patent
Zhang

(10) Patent No.: US 7,969,720 B2
(45) Date of Patent: Jun. 28, 2011

(54) DISPLAY APPARATUS WITH ON SCREEN DISPLAY CONTROLLER

(75) Inventor: Xiang Zhang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 966 days.

(21) Appl. No.: 11/899,187

(22) Filed: Sep. 4, 2007

(65) Prior Publication Data

US 2008/0055240 A1  Mar. 6, 2008

(30) Foreign Application Priority Data

Sep. 1, 2006 (TW) ................... 95132395 A

(51) Int. Cl.
*H05K 7/12* (2006.01)

(52) U.S. Cl. ......... 361/679.22; 361/679.21; 361/679.02; 361/816

(58) Field of Classification Search ............. 361/679.21, 361/679.22, 679.01, 679.08, 816, 818; 248/917–924; 345/168–172; 174/35 R, 174/35 GC
See application file for complete search history.

(56) References Cited

U.S. PATENT DOCUMENTS

| | | | | |
|---|---|---|---|---|
| 5,455,743 A * | 10/1995 | Miyajima | .................... | 361/781 |
| 5,631,673 A * | 5/1997 | Yamamoto et al. | ...... | 361/679.08 |
| 6,707,478 B2 * | 3/2004 | Kim | .............................. | 345/156 |
| 6,791,041 B1 * | 9/2004 | Chen et al. | .................. | 200/51 R |
| 2006/0175879 A1 * | 8/2006 | Chiang et al. | ............ | 297/188.04 |
| 2006/0239445 A1 * | 10/2006 | Fuhrmann et al. | ....... | 379/428.01 |
| 2006/0244721 A1 | 11/2006 | Wang et al. | | |

FOREIGN PATENT DOCUMENTS

TW          M278901 Y    10/2005
* cited by examiner

*Primary Examiner* — Jayprakash N Gandhi
*Assistant Examiner* — Ingrid Wright
(74) *Attorney, Agent, or Firm* — Wei Te Chung

(57) ABSTRACT

An exemplary display apparatus (2) includes a front cover (21) having an opening (210) and a peripheral side (211) beside the opening; an on screen display button board (22) having a main body (223) with locating holes (2234); and a display panel (23) having a display area (231) corresponding to the opening of the front cover and a peripheral area (232) around the display area. Locating pins (216) are provided on a rear face (215) of the peripheral side, and the locating pins pass through the locating holes of the main body, as well as part of the peripheral area of the display panel is overlapped with the main body, thereby, the main body of the on screen display button board is sandwiched between the rear face of the peripheral side of the front cover and the display panel.

18 Claims, 5 Drawing Sheets

DISPLAY APPARATUS WITH ON SCREEN DISPLAY CONTROLLER

FIELD OF THE INVENTION

The present invention relates to display apparatuses, and more particularly to a display apparatus with an on screen display controller.

GENERAL BACKGROUND

Two common kinds of display apparatuses are cathode ray tube (CRT) monitors and liquid crystal display (LCD) monitors. These display apparatuses typically provide an on screen display (OSD) function, which allows a user to control various characteristics of images that are displayed by the display apparatus. The display apparatus is equipped with an OSD controller, which the user operates. For example, the OSD controller allows the user to adjust the color, brightness, and size of images displayed by the display apparatus.

FIG. 4 is an exploded, isometric view of a typical display apparatus. The display apparatus 1 includes a front cover 11, a display panel 13, a shield case 15, a rear cover 16, and an OSD controller 17. The front cover 11 engages with the rear cover 16 to form a closed space therebetween. The display panel 13, the shield case 15, and the OSD controller 17 are received in the closed space. The display panel 13 and the OSD controller 17 are disposed between the front cover 11 and the shield case 15.

The front cover 11 includes an opening 110, first, second, third, and fourth peripheral sides 111, 112, 113, 114 around the opening 110, and four side walls 118. The first, second, third, and fourth peripheral sides 111, 112, 113, 114 cooperatively frame the opening 110. The side walls 118 also cooperatively form a frame, and perpendicularly extend from the first, second, third, and fourth peripheral sides 111, 112, 113, 114, respectively. Each of the side walls 118 includes a plurality of locking lugs 1181 disposed on an inner surface thereof.

The first peripheral side 111 is below the opening 110. Four button-passing holes 117 are defined in the first peripheral side 111. The first peripheral side 111 includes a rear face 115. The rear face 115 has four locating pins 116 extending therefrom, and three supporting lugs 119 extending therefrom. The locating pins 116 are horizontally arranged adjacent to the side wall 118 corresponding to the first peripheral side 111. The supporting lugs 119 are horizontally arranged adjacent to the opening 110. The button-passing holes 117 are horizontally located between the locating pins 116 and the supporting lugs 119.

The OSD controller 17 includes an OSD button board 12, and a printed circuit board 14 corresponding to the OSD button board 12. The OSD button board 12 includes a main body 123, four buttons 122 corresponding to the button-passing holes 117, and four locating holes 1234 corresponding to the locating pins 116. The locating holes 1234 are below the buttons 122. The buttons 122 are connected to the main body 123 of the OSD button board 12 via a plurality of elastic members 121, and the buttons 122 protrude forward from the main body 123. Each of the buttons 122 includes a rear face (not labeled) facing the printed circuit board 14, and two posts 124 extending from the rear face.

Also referring to FIG. 5, another exploded, isometric view of the display apparatus 1 is shown. The printed circuit board 14 includes a plurality of switches 141 corresponding to the posts 124 of the buttons 122, respectively. The posts 124 can move to press and turn on the switches 141, so as to adjust various OSD settings of the display apparatus 1.

The rear cover 16 includes four peripheral side walls (not labeled). The side walls define a plurality of grooves 160 therein, corresponding to the locking lugs 1181 of the front cover 11. The display panel 13 includes a display area 131 corresponding to the opening 110 of the front cover 11, and a peripheral area 132 around the display area 131. The display area 131 is provided to display images thereon.

The display apparatus 1 is assembled by the following steps. Firstly, the OSD button board 12 is disposed on the rear face 115 of the first peripheral side 111 of the front cover 11. At the same time, the buttons 122 pass through the button passing-holes 117 and protrude from a front face (not labeled) of the first peripheral side 111, and the locating pins 116 pass through the locating holes 1234. Secondly, an end of each locating pin 116 protruding out from the corresponding locating hole 1234 is melted or pressed down to ensure that the locating pin 116 is firmly attached on the main body 123 of the OSD button board 12. Thereby, the OSD button board 12 is tightly fixed to the rear face 115 of the first peripheral side 111 of the front cover 11. Thirdly, the display panel 13 and the printed circuit board 14 are fixed to the shield case 15, respectively. The printed circuit board 14 is disposed below the peripheral area 132 of the display panel 13. Fourthly, the shield case 15 is positioned in a rear of the front cover 11, with a bottom side (not labeled) of the peripheral area 132 of the display panel 13 being supported on the supporting lugs 119 of the first peripheral side 111. The display area 131 of the display panel 13 faces the opening 110 of the front cover 11, and the switches 141 of the printed circuit board 14 face the posts 124 of the buttons 122 of the OSD button board 12. Finally, the rear cover 16 is coupled with the front cover 11, with the locking lugs 1181 of the front cover 11 engaging in the grooves 160 of the rear cover 16. Thereby, the closed space is formed, with the OSD controller 17, the display panel 13, and the shield case 15 being accommodated in the closed space.

In the above assembly process, each locating pin 116 needs to be melted or pressed down to ensure that the locating pin 116 is firmly attached on the main body 123 of the OSD button board 12. This process adds to the complexity and cost of assembling the display apparatus 1.

What is needed, therefore, is a display apparatus that can overcome the above-described deficiencies.

SUMMARY

A display apparatus includes a front cover having an opening and a peripheral side beside the opening; an on screen display button board having a main body with at least one locating hole; and a display panel having a display area corresponding to the opening of the front cover and a peripheral area around the display area. At least one locating pin is provided on a rear of the peripheral side, the at least one locating pin extends through the at least one locating hole of the main body, part of the peripheral area of the display panel overlaps part of the main body of the on screen display button board, and thereby the main body of the on screen display button board is sandwiched between the rear of the peripheral side of the front cover and the display panel.

Other advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the preferred and exemplary embodiments in detail.

Figure 1:
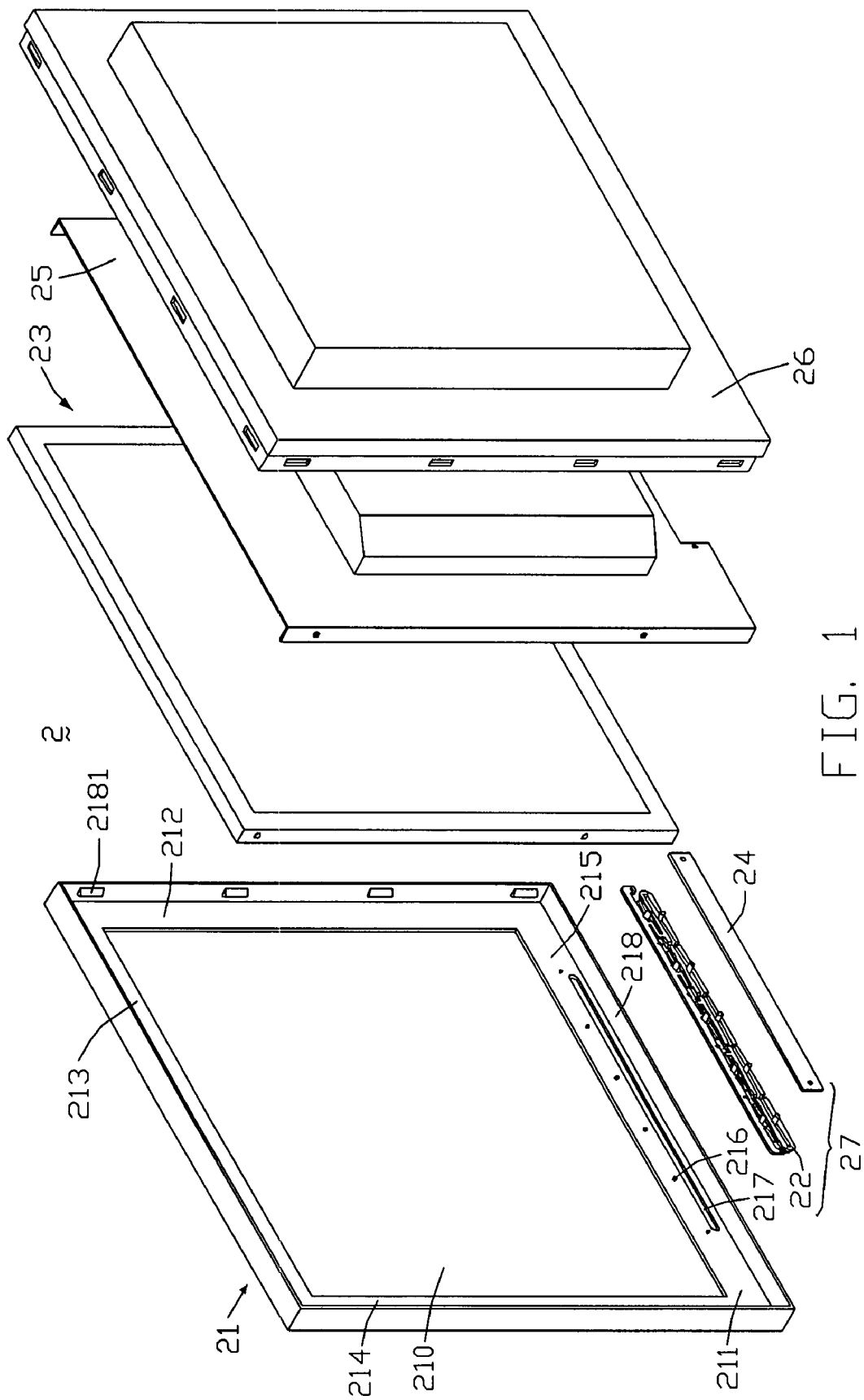
FIG. 1 is an exploded, isometric view of a display apparatus according to an exemplary embodiment of the present invention, the display apparatus including an OSD button board.

FIG. 1 is an exploded, isometric view of a display apparatus according to an exemplary embodiment of the present invention. The display apparatus 2 includes a front cover 21, a display panel 23, a shield case 25, a rear cover 26, and an OSD controller 27. The front cover 21 couples with the rear cover 26 to form a closed space therebetween. The display panel 23, the shield case 25, and the OSD controller 27 are received in the closed space. The display panel 23 and the OSD controller 27 are disposed between the front cover 21 and the shield case 25.

The front cover 21 includes an opening 210, first, second, third, and fourth peripheral sides 211, 212, 213, 214 around the opening 210, and four side walls 218. The first, second, third, and fourth peripheral sides 211, 212, 213, 214 cooperatively frame the opening 210. The side walls 218 also cooperatively form a frame, and perpendicularly extend from the first, second, third, and fourth peripheral sides 211, 212, 213, 214, respectively. Each of the side walls 218 includes a plurality of locking lugs 2181 disposed on an inner surface thereof.

The first peripheral side 211 is below the opening 210. A button slit 217 is defined in the first peripheral side 211. The first peripheral side 211 includes a rear face 215. The rear face 215 has a plurality of locating pins 216 extending therefrom. In the illustrated embodiment, there are six locating pins 216. The locating pins 216 are substantially equidistantly arranged adjacent to the opening 210. The button slit 217 is located between the locating pins 216 and the side wall 218 corresponding to the first peripheral side 211.

Figure 2:
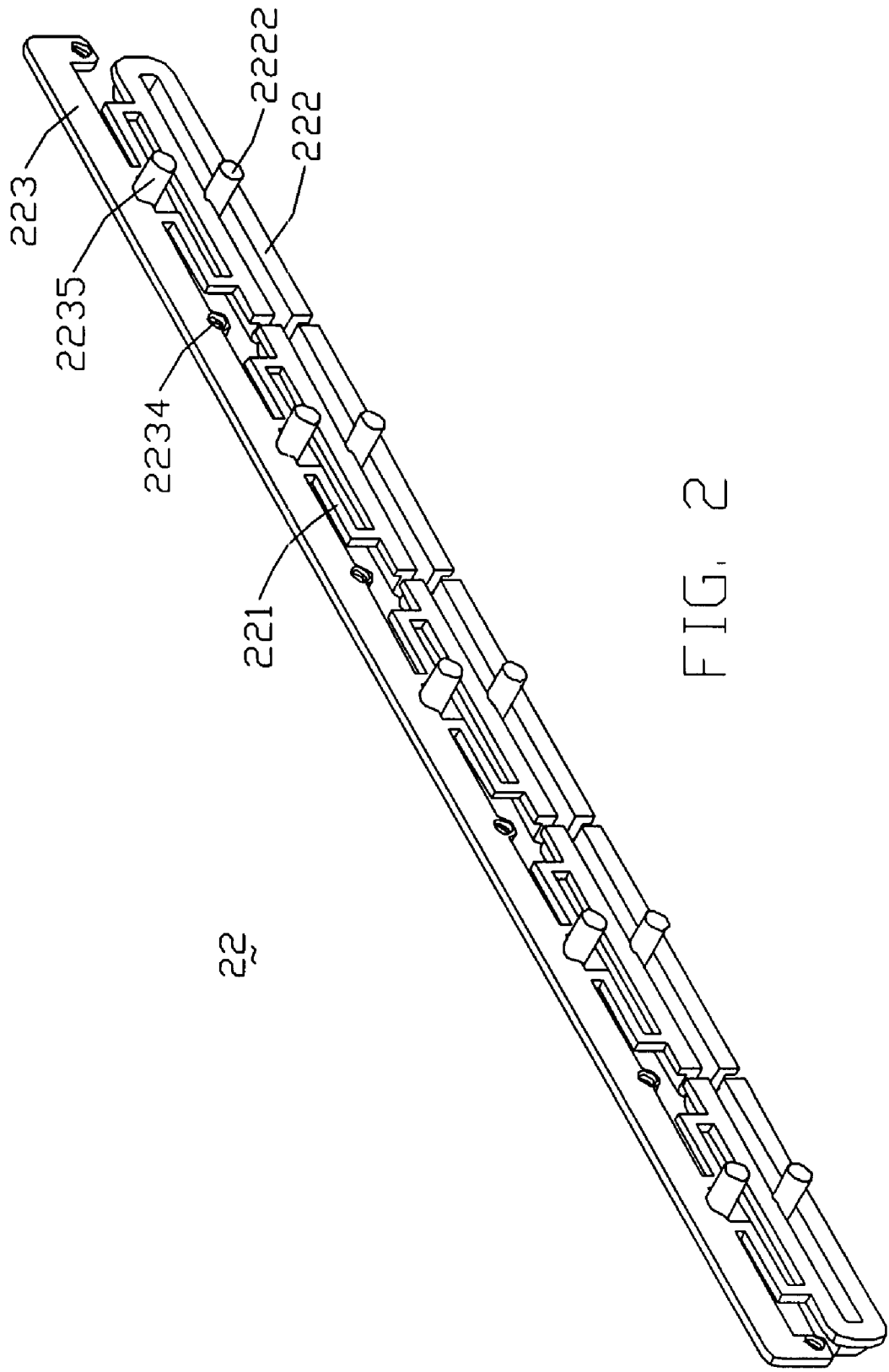
FIG. 2 is an enlarged view of the OSD button board of the display apparatus of FIG. 1.

The OSD controller 27 includes an OSD button board 22, and a printed circuit board 24 corresponding to the OSD button board 22. FIG. 2 is an enlarged view of the OSD button board 22. The OSD button board 22 includes a main body 223, a plurality of buttons 222 corresponding to the button slit 217, and a plurality of coupling bars 221 interconnecting the main body 223 and the buttons 222. In the illustrated embodiment, there are five buttons 222. Each of the buttons 222 is connected to the main body 223 of the OSD button board 22 via two corresponding coupling bars 221. The two coupling bars 221 are symmetrically arranged relative to each other.

The main body 223 includes a plurality of locating holes 2234 corresponding to the locating pins 216, and a plurality of supporting posts 2235. In the illustrated embodiment, there are six locating holes 2234, and five supporting posts 2235. The locating holes 2234 and the supporting posts 2235 are alternately arranged along a top portion of the main body 223. The supporting posts 2235 are located above the buttons 222, and the locating holes 2234 are located generally between the buttons 222.

A main body of each button 222 has a substantially U-shaped transverse cross-section. The buttons 222 protrude forward from the main body 223. Each pair of coupling bars 221 connects with a top end (not labeled) of the corresponding button 222. Each button 222 includes a contacting post 2222 extending toward the printed circuit board 24.

Figure 3:
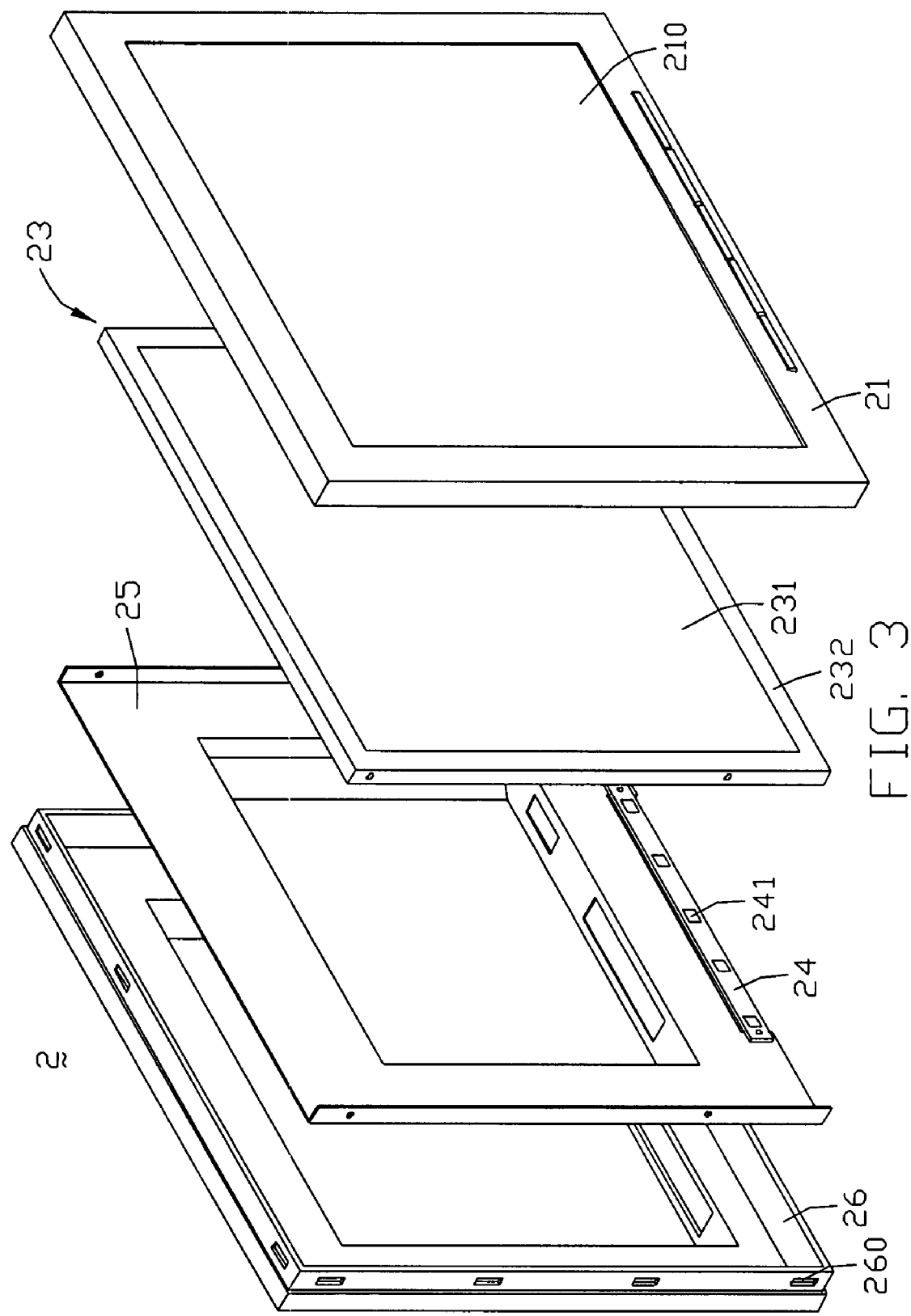
FIG. 3 is an exploded, isometric view of the display apparatus of FIG. 1, but viewed from another aspect.
Figure 4:
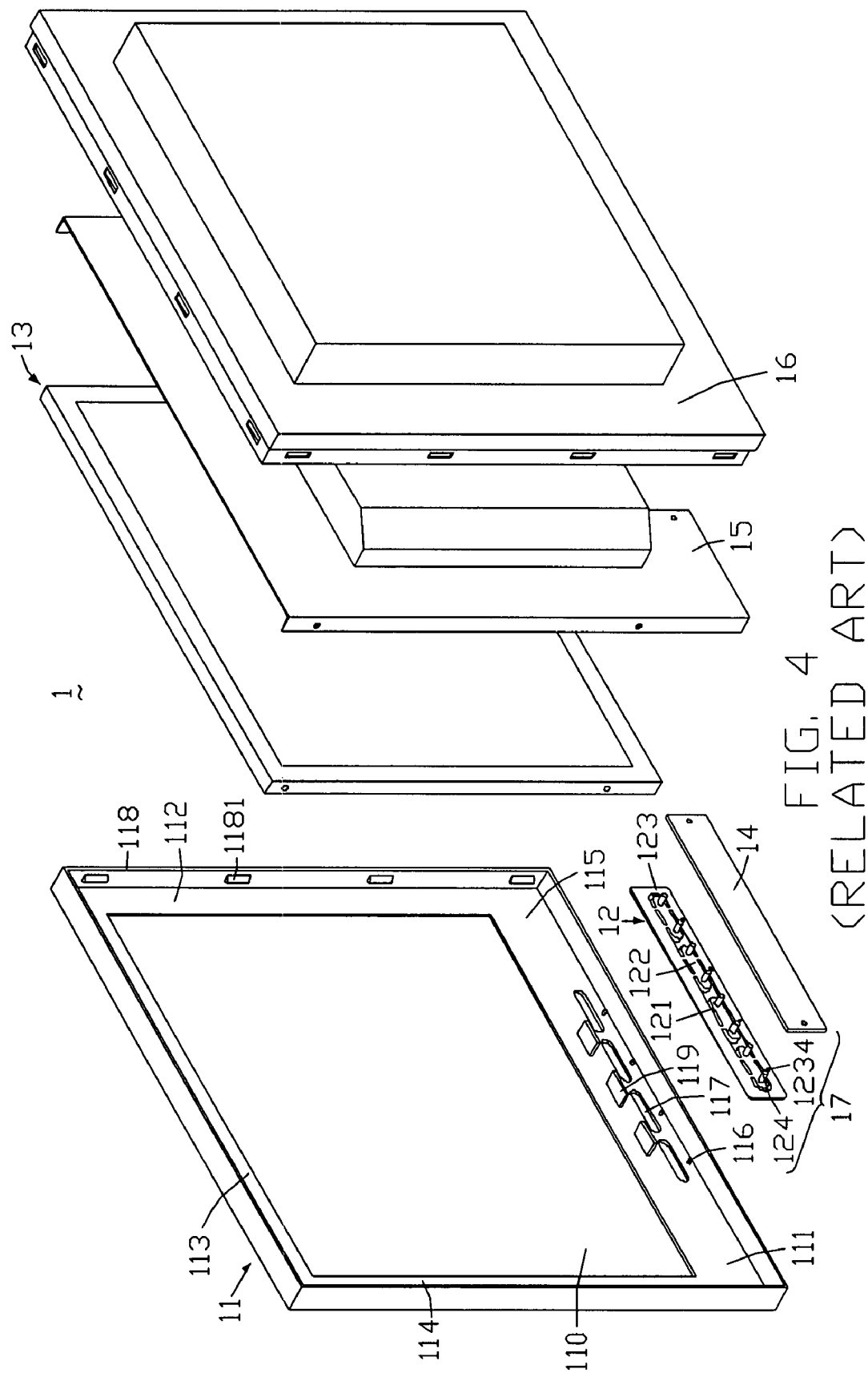
FIG. 4 is an exploded, isometric view of a conventional display apparatus.
Figure 5:
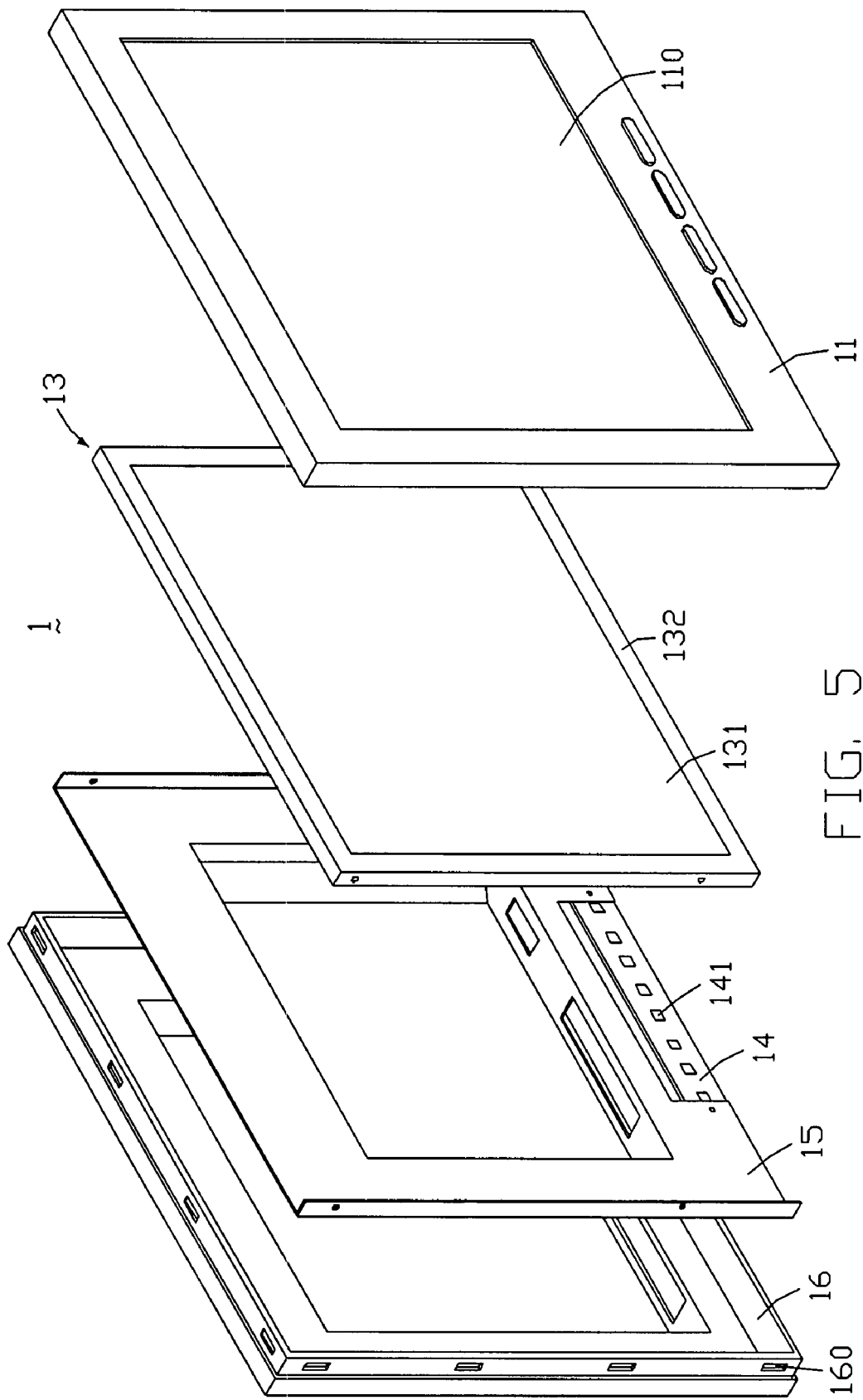
FIG. 5 is an exploded, isometric view of the display apparatus of FIG. 4, but viewed from another aspect.

FIG. 3 is another exploded, isometric view of the display apparatus 2. The printed circuit board 24 includes a plurality of switches 241 corresponding to the contacting posts 2222 of the buttons 222, respectively. The contacting posts 2222 can move to press and turn on the switches 241, so as to adjust various OSD settings of the display apparatus 2.

The rear cover 26 includes four peripheral side walls (not labeled). The side walls define a plurality of grooves 260 therein, corresponding to the locking lugs 2181 of the front cover 21. The display panel 23 includes a display area 231 corresponding to the opening 210 of the front cover 21, and a peripheral area 232 around the display area 231. The display area 231 is provided to display images thereon.

The display apparatus 2 is assembled by the following steps. Firstly, the OSD button board 22 is disposed on the rear face 215 of the first peripheral side 211 of the front cover 21. At the same time, the buttons 222 pass through the button slit 217 and protrude from a front side (not labeled) of the first peripheral side 211, and the locating pins 216 pass through the locating holes 2234. Secondly, the display panel 23 and the printed circuit board 24 are fixed to the shield case 25, respectively. The printed circuit board 24 is disposed below the peripheral area 232 of the display panel 23. Thirdly, the shield case 25 is positioned in a rear of the front cover 21. Thereby, the display area 231 of the display panel 23 faces the opening 210 of the front cover 21, and the switches 241 of the printed circuit board 24 face the contacting posts 2222 of the buttons 222. Fourthly, part of the peripheral area 232 of the display panel 23 is positioned to overlap part of the main body 223 of the OSD button board 22, and thereby press the OSD button board 22 against the rear face 215 of the first peripheral side 211. At the same time, the supporting posts 2235 of the OSD button board 22 push against the printed circuit board 24. Thus, the main body 223 of the OSD button board 22 is tightly sandwiched between the display panel 23 and the rear face 215 of the first peripheral side 211 of the front cover 21. Finally, the rear cover 26 is coupled with the front cover 21, with the locking lugs 2181 of the front cover 21 engaging in the grooves 260 of the rear cover 26. Thereby, the closed space is formed, with the display panel 23, the shield case 25, and the OSD controller 27 being accommodated in the closed space.

When a user needs to adjust the OSD settings of the display apparatus 2, he/she presses a selected one of the buttons 222. The coupling bars 221 connected with the button 222 elastically deform, and the button 222 together with the contacting post 2222 thereof move rearward. The contacting post 2222 presses and turns on the corresponding switch 241 of the printed circuit board 24. The printed circuit board 24 sends a control signal to the display panel 23 to adjust the corresponding OSD setting of the display apparatus 2. The button 222 together with the contacting post 2222 thereof then spring back to their original position due to elastic rebounding of the coupling bars 221.

As described above, part of the peripheral area 232 of the display panel 23 overlaps part of the main body 223 of the OSD button board 22 to press the OSD button board 22 against the rear face 215 of the first peripheral side 211.

Moreover, the supporting posts 2235 of the OSD button board 22 push against the printed circuit board 24. Therefore, the main body 223 of the OSD button board 22 is tightly sandwiched between the display panel 23 and the rear face 215 of the first peripheral side 211 of the front cover 21. Thus, there is no need to melt or press down the locating pins 216 to ensure that the locating pins 211 are fixedly attached to the main body 223 of the OSD button board 22. This simplifies the process of assembling the display apparatus 2, and reduces costs.

Furthermore, because part of the peripheral area 232 of the display panel 23 overlaps part of the main body 223 of the OSD button board 22, the space needed for installing the display panel 23 and the OSD controller 27 is reduced. Correspondingly, the size of the front cover 21 and the rear cover 26 for receiving the display panel 23 and the OSD controller 27 can be minimized. Accordingly, the amount of material needed for making the front cover 21 and the rear cover 26 is reduced, which lowers the cost of the display apparatus 2.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display apparatus, comprising:
   a front cover comprising an opening and a peripheral side beside the opening;
   an on screen display button board comprising a main body with at least one locating hole; and
   a display panel comprising a display area corresponding to the opening of the front cover and a peripheral area around the display area;
   wherein at least one locating pin is provided on a rear of the peripheral side, the at least one locating pin extends through the at least one locating hole of the main body, part of the peripheral area of the display panel overlaps part of the main body of the on screen display button board, and thereby the main body of the on screen display button board is sandwiched between the rear of the peripheral side of the front cover and the display panel.

2. The display apparatus as claimed in claim 1, further comprising a shield case, the display panel being fixed to the shield case, and the display panel being disposed between the front cover and the shield case.

3. The display apparatus as claimed in claim 2, further comprising a printed circuit board corresponding to the on screen display button board, the printed circuit board being fixed to the shield case, and the printed circuit board being disposed between the front cover and the shield case.

4. The display apparatus as claimed in claim 3, wherein the main body further comprises at least one supporting post abutting against the printed circuit board.

5. The display apparatus as claimed in claim 3, wherein the printed circuit board comprises at least one switch.

6. The display apparatus as claimed in claim 4, wherein the on screen display button board further comprises at least one button connected with the main body.

7. The display apparatus as claimed in claim 6, wherein the at least one button has a generally U-shaped transverse cross-section.

8. The display apparatus as claimed in claim 7, wherein the at least one button protrudes forward from the main body of the on screen display button board.

9. The display apparatus as claimed in claim 6, wherein the at least one button is connected with the main body of the on screen display button board via at least one elastic coupling member.

10. The display apparatus as claimed in claim 6, wherein the printed circuit board comprises at least one switch, and the at least one button comprises a contacting post corresponding to the at least one switch.

11. The display apparatus as claimed in claim 6, wherein the peripheral side of the front cover further comprises at least one hole, the at least one hole receiving the at least one button of the on screen display button board such that the at least one button is movable in the at least one hole.

12. The display apparatus as claimed in claim 6, wherein the main body includes a side edge adjacent to the at least one button, and the at least one locating hole is located adjacent to the side edge.

13. The display apparatus as claimed in claim 1, wherein the at least one locating pin is arranged adjacent to the opening of the front cover.

14. The display apparatus as claimed in claim 1, further comprising a rear cover coupled with the front cover, the rear cover and the front cover cooperatively accommodate the display panel and the on screen display button board.

15. A display apparatus, comprising:
   a front cover comprising an opening and a peripheral side beside the opening;
   an on screen display button board located around the peripheral side and comprising a main body;
   a display panel located behind the front cover and comprising a display area corresponding to the opening of the front cover and a peripheral area around the display area; and
   an interengagement device including a locating pin provided on one of said peripheral side and said on screen display button board, and a locating hole formed in the other; wherein
   the locating pin extends through the locating hole, part of the peripheral area of the display panel overlaps part of the main body of the on screen display button board, and thereby the main body of the on screen display button board is sandwiched between the peripheral side of the front cover and the display panel.

16. The display apparatus as claimed in claim 14, wherein the locating pin is formed on the front cover, and the through hole is formed in the on screen display button board.

17. A display apparatus, comprising:
   a front cover comprising an opening and a bottom side beside the opening;
   an on screen display button board located around the bottom side and comprising a main body; and
   a display panel located behind the front cover and comprising a display area corresponding to the opening of the front cover and a bottom area around the display area, under a condition that the one screen display button board is sandwiched between the bottom side and the bottom area in a front-to-back direction; wherein
   an interengagement device including a locating pin provided on one of said peripheral side and said on screen display button board, and a locating hole formed in the other; wherein
   an interengagement device is provided one at least one of said front cover, said display panel and said on screen display button board to restrict transverse movement of the one screen display button board with regard to the front cover and said display panel.

18. The display apparatus as claimed in claim 17, wherein said interengagement device includes a locating pin formed on one of said display panel and said front cover, and a through hole formed in the on screen display button board.

* * * * *